Jan. 26, 1965   B. R. HEPBURN   3,166,813
PIPE COUPLING
Filed Oct. 17, 1963

INVENTOR
BERNARD RICKART HEPBURN

BY~ *Maybee & Legris*

ATTORNEYS

United States Patent Office 3,166,813
Patented Jan. 26, 1965

3,166,813
PIPE COUPLING
Bernard R. Hepburn, Oakville, Ontario, Canada, assignor to National Sewer Pipe Limited, Oakville, Ontario, Canada
Filed Oct. 17, 1963, Ser. No. 316,831
Claims priority, application Great Britain, Oct. 23, 1962, 40,166/62
1 Claim. (Cl. 24—280)

This invention relates to pipe couplings and particularly to clamping means for plain end pipe couplings of the kind disclosed in our U.S. application 198,260 filed May 28, 1962.

The object of the invention is to devise a simple clamping means which can be quickly and easily tightened and yet will not be tightened sufficiently to break or weaken the coupling.

In U.S. application 198,260 there is disclosed a means to indicate when sufficient pressure has been applied to the coupling comprising an end portion on the tightening bolt which is adapted to bend when the bolt is tightened to indicate when sufficient tightening force has been applied to the resilient band.

According to the present invention the indicating means comprises the end portion of the resilient band rather than the end portion of the tightening bolt.

The invention is illustrated in the accompanying drawings in which.

In the drawings, corresponding reference numerals refer to corresponding parts.

Figure 1:
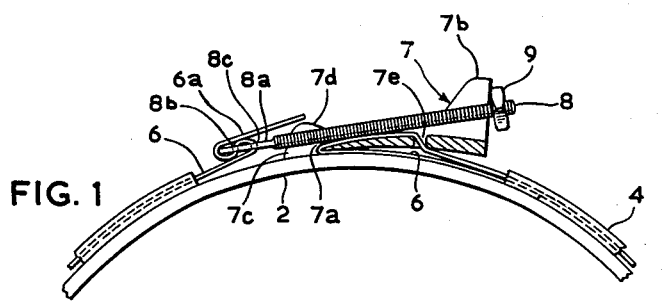
FIGURE 1 is a side view of the connecting or clamping means before tightening.

As is disclosed in my aforesaid application 198,260, in practice there will be two connecting and tightening or clamping devices for each coupling but for purposes of this invention only one is shown in the drawing.

The coupling 2 is provided with a hollow ridge 4 through which passes metal band 6, fitting loosely therein, to provide slack in the resilient band prior to tightening the coupling.

A connector for connecting the ends of the band and applying tightening force to the band includes a bracket 7, a bolt 8 and a nut 9. The bracket 7 is elongated in form and provided with a longitudinal recess 7a in its upper surface, spaced apart upwardly extending lugs 7b, 7b at one end, a transverse recess 7c in its other end and upwardly extending guide lugs 7d, 7d.

One end of the band 6 extends upwardly through slot 7e in the underside of the longitudinal recess 7a, along the bottom of the longitudinal recess 7a to the other end of the bracket, around the end of the bracket in the recess 7c and back beneath the bracket to a point about one-half (½) inch within the ridge 4.

By this arrangement the band 6 is in engagement with the belt 2 throughout substantially the whole length of the bracket 7. The base of the bracket 7 is curved to substantially the same curvature as the belt 2.

The other end of the band 6 is secured to the bolt 8. An enlarged flattened bolt head 8a has an outer transverse slot 8b near the outer end of the bolt head and an inner parallel transverse slot 8c at the inner end of the bolt head. The band 6 extends under the flattened end 8a, up through the inner slot 8c, down through the outer slot 8b and its free end portion 6a extends around and in contact with the end of the bolt head as shown in FIGURE 1.

The bolt 8 is adapted to lie in the recess 7a of the bracket 7 on top of the band 6 and to extend between the lugs 7b, 7b and 7d, 7d. Nut 9 may be tightened on the end of bolt 8 pulling the ends of the band 6 together and thus compressing the coupling 2 into close contact with a pipe which it surrounds.

The arrangement is such that when the clamping device is tightened the bolt head 8a rides over the top of lugs 7d, 7d drawing the band 6 over the lugs so that the band is drawn into the recess 7a. The clamping device is arranged so that the required tightening force to seal the pipe will be obtained before bolt head 8a makes contact with the upwardly extending lugs 7b, 7b.

According to the invention as disclosed in application 198,260, as tightening force is applied, the flat end 8a of the bolt 8 will be bent up thus preventing stripping of the bolt's threads and indicating to the user that sufficient pressure has been applied.

Figure 2:
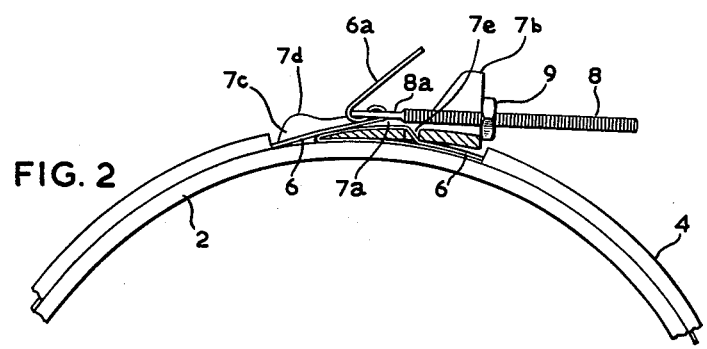
FIGURE 2 is a side view of the connecting or clamping means after tightening.
Figure 3:
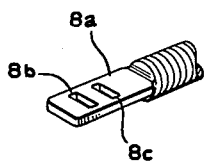
FIGURE 3 is a perspective view of a bolt head containing a pair of transverse parallel slots.

According to the present invention the head portion 8a of the bolt 8 is sufficiently strong and rigid that it will not bend sufficiently to serve as a visual signal but instead the end portion 6a of the band 6 will commence to deflect up as stress increases on the band and when maximum desired pressure is applied it will be approaching a position of about 45° to the plane of bolt head 8a, as indicated in FIGURE 2, indicating that further tightening of the coupling is unnecessary and might result in breakage of the bolt or stripping of the threads.

To obtain the movement of end portion 6a of band 6 that acts as a visual signal to indicate that the necessary amount of tightening force has been applied, the clamping means, which includes the bracket 7, the bolt 8, the nut 9 and the band 6, is designed so there will be no failure of its components when subjected to a load sufficient to obtain the necessary amount of tightening force. The unique method of threading band 6 through slots 8b and 8c in bolt head 8a creates a strong load bearing frictional connection. As the tightening force is increased it will finally overcome the frictional force of the connection between the band 6 and the slots in bolt head 8a and slipping of the band in the slots will occur. Since end portion 6a of band 6 has been bent around the end of bolt head 8a so that it will be in contact with the end of the bolt head, slipping of the band will cause the end of the bolt head to press against the band tending to unwind the free end of the band causing it to be deflected upwardly, as shown in FIGURE 2.

Because of the threading of the band through the two transverse parallel slots in the bolt head and the slight work hardening of the band due to its deformation as it slips, the application of a force in excess of the necessary tightening force for the coupling must be applied to cause further slipping. The initial band slippage to obtain the deflection signal neither results in ineffective closure of the coupling nor final failure.

It is to be understood that the form of the invention herewith shown and described is to be taken as a preferred example of the same, and that various changes in the shape, size and arrangement of the parts may be resorted to without departing from the spirit of the invention or the scope of the subjoined claim.

What I claim as my invention is:

A clamping means for a pipe coupling comprising a resilient band adapted to encircle the coupling and a connector for connecting the ends of the band and applying tightening force to the band, the connector including a bolt having a head with an inner transverse slot adjacent the inner end of the bolt head and an outer parallel transverse slot adjacent the outer end of the bolt head, the band passing under the head, up through the inner slot, over the head, down through the outer slot, and around and in contact with the outer end of the bolt head, the band being of such resilience that when so threaded through the bolt head the free end of the band will deflect in a predetermined manner when sufficient tightening force has been applied to the band.

References Cited in the file of this patent

UNITED STATES PATENTS

| 1,816,197 | Ruemelin | July 28, 1931 |

FOREIGN PATENTS

| 212,591 | Australia | May 17, 1956 |
| 1,256,870 | France | Feb. 13, 1961 |